US010313571B2

(12) United States Patent
Minikey, Jr. et al.

(10) Patent No.: US 10,313,571 B2
(45) Date of Patent: Jun. 4, 2019

(54) IMAGER MODULE FOR VEHICLE

(71) Applicant: Gentex Corporation, Zeeland, MI (US)

(72) Inventors: Danny L. Minikey, Jr., Fenwick, MI (US); Michael G. Hendricks, Wyoming, MI (US)

(73) Assignee: GENTEX CORPORATION, Zeeland, MI (US)

( * ) Notice: Subject to any disclaimer, the term of this patent is extended or adjusted under 35 U.S.C. 154(b) by 144 days.

(21) Appl. No.: 15/458,521

(22) Filed: Mar. 14, 2017

(65) Prior Publication Data

US 2017/0272633 A1 Sep. 21, 2017

Related U.S. Application Data

(60) Provisional application No. 62/309,174, filed on Mar. 16, 2016.

(51) Int. Cl.
*B60R 9/05* (2006.01)
*H04N 5/225* (2006.01)
*B60R 1/00* (2006.01)
*H04N 7/18* (2006.01)

(52) U.S. Cl.
CPC ............. *H04N 5/2257* (2013.01); *B60R 1/00* (2013.01); *H04N 5/2254* (2013.01); *H04N 7/183* (2013.01)

(58) Field of Classification Search
CPC ...... B60R 2300/802; B60R 2300/8046; B60R 2300/8066; B60R 2001/1253
See application file for complete search history.

(56) References Cited

U.S. PATENT DOCUMENTS

| 7,965,336 | B2 | 6/2011 | Bingle et al. |
| 9,477,064 | B1* | 10/2016 | Chen ................. G02B 7/14 |
| 2004/0017501 | A1 | 1/2004 | Asaga et al. |
| 2004/0164228 | A1* | 8/2004 | Fogg ................. B60Q 1/1423 |
| | | | 250/208.1 |
| 2009/0160987 | A1* | 6/2009 | Bechtel ............... H04N 5/353 |
| | | | 348/302 |
| 2009/0242361 | A1 | 10/2009 | Haendler et al. |
| 2009/0244361 | A1 | 10/2009 | Gebauer et al. |
| 2014/0043519 | A1 | 2/2014 | Azuma et al. |

(Continued)

OTHER PUBLICATIONS

International Search Report and Written Opinion of the International Searching Authority, or the Declaration, dated Jun. 29, 2017, for International Application No. PCT/US2017/022298, filed Mar. 14, 2017, 9 pages.

*Primary Examiner* — Pankaj Kumar
*Assistant Examiner* — Timothy R Newlin
(74) *Attorney, Agent, or Firm* — Price Heneveld LLP; Bradley D. Johnson

(57) ABSTRACT

An imager assembly for a vehicle is disclosed. The assembly comprises an optic lens forming a longitudinal axis extending between a proximal end portion and a distal end portion. The assembly further comprises an imager circuit in conductive connection with an imager connector. The imager connector is configured to communicatively connect the imager circuit to the vehicle. The assembly further comprises a lens holder configured to receive the proximal end portion of the optic lens and align the imager circuit with the optic lens. The conductive connection of the imager connector to the imager circuit is located between the proximal end portion and the distal end portion.

18 Claims, 4 Drawing Sheets

(56) References Cited

U.S. PATENT DOCUMENTS

| | | | |
|---|---|---|---|
| 2015/0334278 A1* | 11/2015 | Apel | G02B 7/023 |
| | | | 348/148 |
| 2017/0111560 A1* | 4/2017 | Chen | H04N 5/2253 |
| 2017/0129419 A1* | 5/2017 | Conger | B60R 11/04 |
| 2017/0272624 A1 | 9/2017 | Minikey, Jr. et al. | |
| 2018/0054555 A1* | 2/2018 | Kunze | H04N 5/2253 |

* cited by examiner

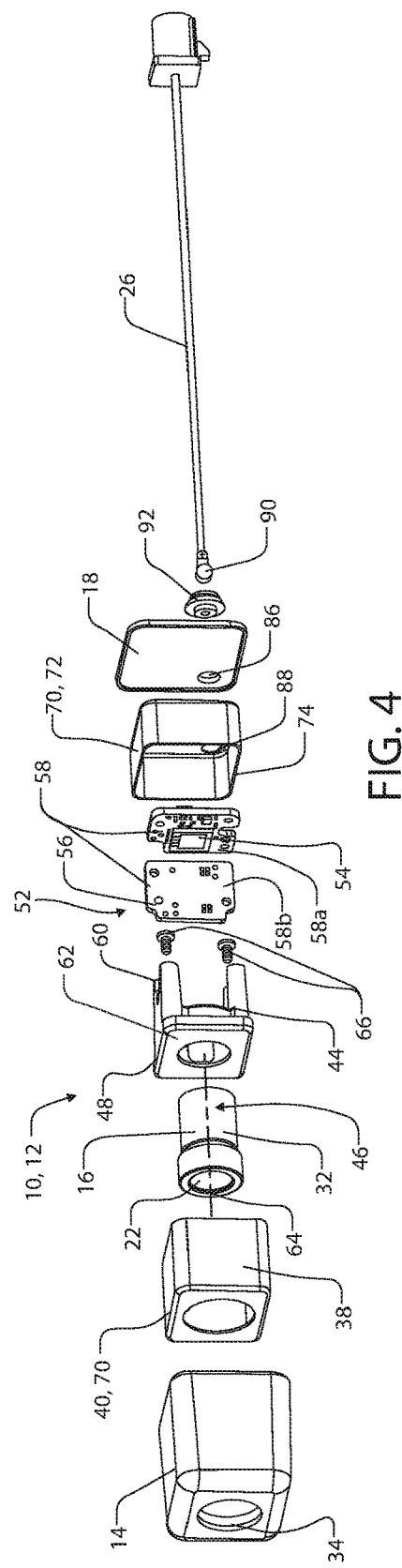
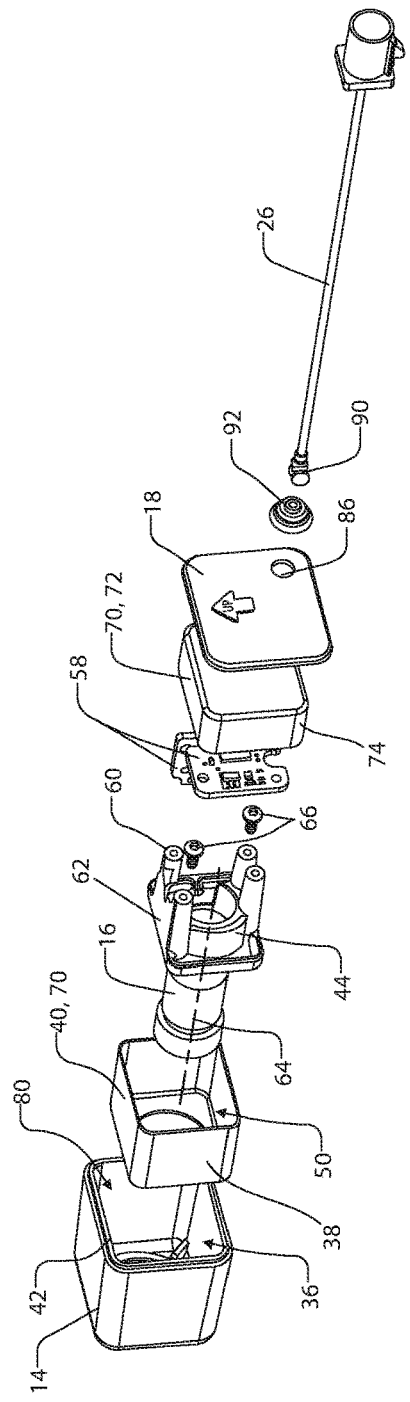

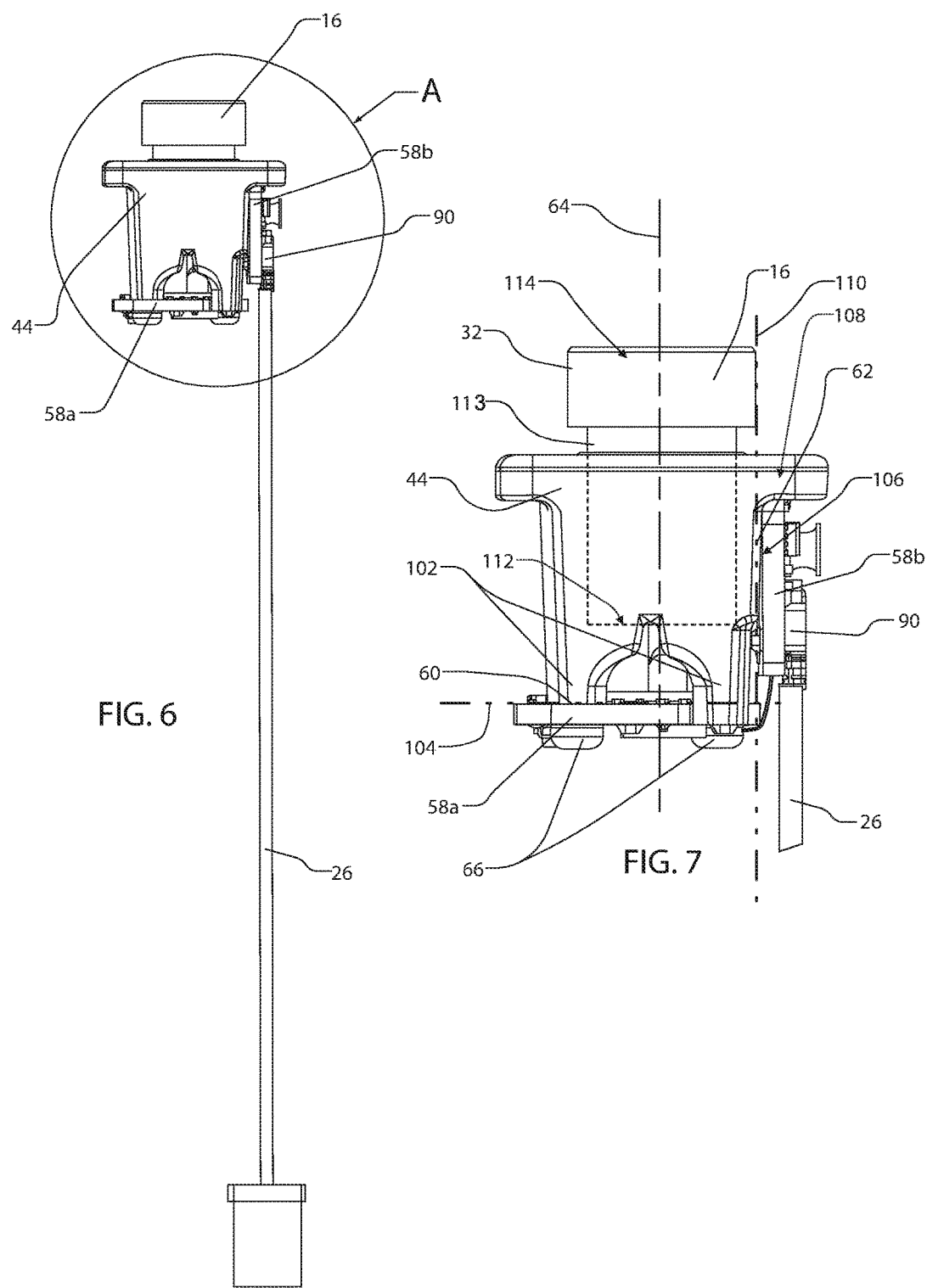

IMAGER MODULE FOR VEHICLE

CROSS-REFERENCE TO RELATED APPLICATION

This application claims priority to and the benefit under 35 U.S.C. § 119(e) of U.S. Provisional Patent Application No. 62/309,174, filed on Mar. 16, 2016, entitled "IMAGER MODULE FOR VEHICLE," the entire disclosure of which is hereby incorporated herein by reference.

TECHNOLOGICAL FIELD

The present invention generally relates to an imager module and more particularly relates to an imager module configured for use with a vehicle.

BRIEF SUMMARY

In one aspect of the invention, an imager assembly for a vehicle is disclosed. The assembly comprises an optic lens forming a longitudinal axis extending between a proximal end portion and a distal end portion. The assembly further comprises an imager circuit comprising a first circuit portion, a second circuit portion, and an imager connector. The imager connector is configured to communicatively connect the imager circuit to the vehicle. The assembly further comprises a lens holder configured to receive the proximal end portion of the optic lens. The lens holder is in connection with the first circuit portion aligning the first circuit portion with the longitudinal axis of the optic lens and is configured to retain the second circuit portion arranged substantially perpendicular to the first circuit portion and substantially parallel to the longitudinal axis.

In another aspect of the invention, an imager assembly for a vehicle is disclosed. The assembly comprises an optic lens forming a longitudinal axis extending between a proximal end portion and a distal end portion. The assembly further comprises an imager circuit in conductive connection with an imager connector. The imager connector is configured to communicatively connect the imager circuit to the vehicle. The assembly further comprises a lens holder configured to receive the proximal end portion of the optic lens and align the imager circuit with the optic lens. The conductive connection of the imager connector to the imager circuit is located between the proximal end portion and the distal end portion.

In yet another aspect of the invention, an imager assembly for a vehicle is disclosed. The assembly comprises an optic lens forming a longitudinal axis extending between a proximal end portion and a distal end portion, and an imager circuit. The imager circuit comprises: a first circuit portion comprising an imager configured to capture image data, a second circuit portion comprising a control circuit configured to control the capture of the image data, and an imager connector. The imager connector is configured to communicatively connect the imager circuit to the vehicle. The assembly further comprises a lens holder configured to receive the proximal end portion of the optic lens. The lens holder is in connection with the first circuit portion aligning the imager with the longitudinal axis of the optic lens. The lens holder is configured to retain the second circuit portion arranged substantially perpendicular to the first circuit portion and substantially parallel to the longitudinal axis.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is an exploded assembly view of an imager module of the present disclosure;

FIG. 5 is an exploded assembly view of an imager module of the present disclosure;

FIG. 6 is a side partial assembly view of an imager module demonstrating Detail A of the present disclosure;

FIG. 7 is an expanded view demonstrating Detail A as introduced in reference to FIG. 6 of the present disclosure;

DETAILED DESCRIPTION

Figure 1:
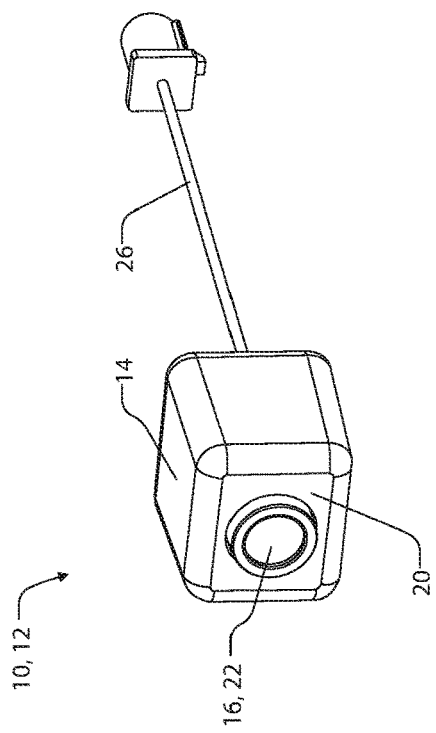
FIG. 1 is a front perspective view of an imager module of the present disclosure.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the imager module closer to an intended viewer, and the term "rear" shall refer to the surface of the imager module further from the intended viewer as shown in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
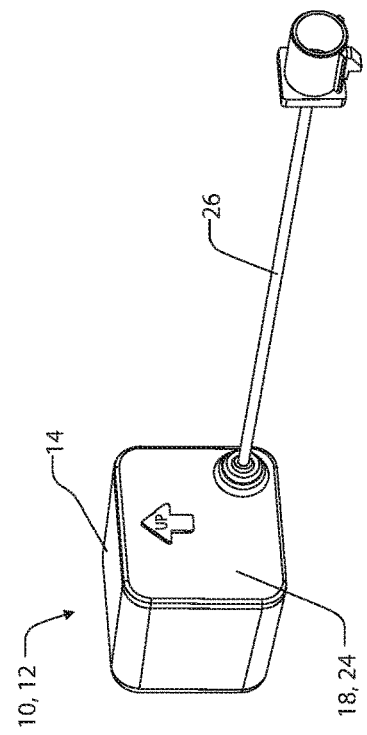
FIG. 2 is a rear perspective view of an imager module of the present disclosure.
Figure 3:
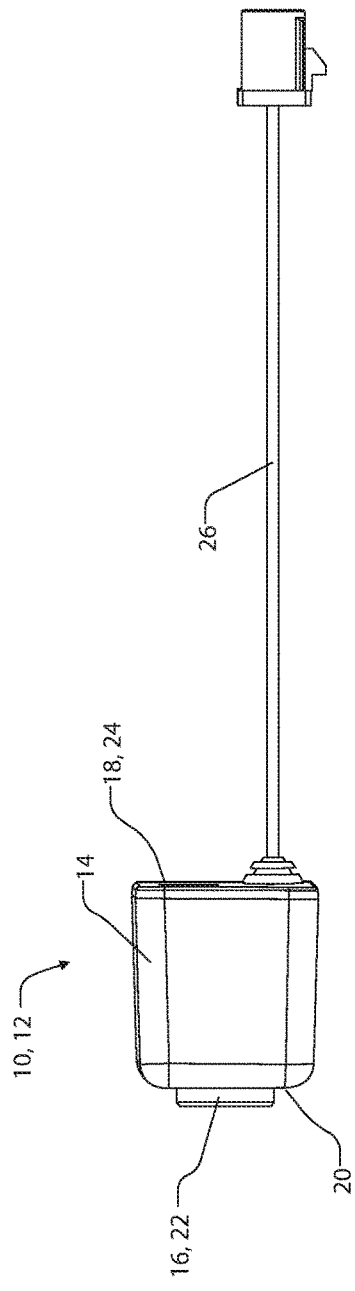
FIG. 3 is a side view of an imager module of the present disclosure.

Referring to FIGS. 1-3, perspective views of an imager module 10 are shown. The imager module may be configured for use with a vehicle. As demonstrated in FIGS. 1-3, the imager module 10 may correspond to an imager assembly 12 comprising a housing 14 configured to at least partially enclose a lens 16. In some embodiments, the imager assembly 12 may form a sealed assembly with the lens 16 and a lid 18. As described herein, a front surface 20 may correspond to a surface of the housing 14 through which the lens 16 protrudes to form an optic surface 22. A rear surface 24 of the imager assembly 12 may correspond to an outer surface of the lid 18 through which an imager connector 26 may pass to communicatively connect the imager module 10 to one or more systems of the vehicle.

As discussed herein, the imager assembly 12 may provide for the imager module 10 to be coupled to or otherwise incorporated in one or more panels or features of a vehicle. For example, the imager module 10 may be incorporated in a spoiler, center high mount stop light, deck lid, brake light, a roof mounted assembly, antenna, and other various portions of the vehicle. In some embodiments, the imager connector 26 may provide for the imager module 10 to be incorporated in such panels of the vehicle while providing for the communicative connection of the imager module 10 to one or more systems of the vehicle. The various embodiments of the imager module 10 as described herein may provide for flexible solutions to implement the imager module 10 in various portions of the vehicle.

Referring to FIGS. 4-5, exploded views of the imager assembly 12 are shown. In an exemplary embodiment, the lens 16 may form a cylindrical profile 32 configured to engage a cylindrical opening 34 formed in the housing 14. In some embodiments, the lens 16 may be coupled to the cylindrical opening 34 via an adhesive or as a threaded assembly mating the cylindrical profile 32 to the cylindrical opening 34. In this configuration, the housing 14 may be configured to receive the lens 16 and form a sealed enclosure for the imager module 10. The housing 14 may provide for an aesthetic cover configured to form a first interior cavity 36 that may enclose one or more elements of the imager assembly 12.

In an exemplary embodiment, a front shield 38 may be disposed in the first interior cavity 36 between the housing 14 and the lens 16. A first exterior profile shape 40 of the front shield 38 may be configured to substantially align with an interior profile 42 of the front shield 38. In this configuration, the housing 14 may be configured to receive the front shield 38 in a stacked, space saving configuration. The front shield 38 may be formed of a conductive material configured to provide for electromagnetic shield to limit electromagnetic interference with the operation of the imager module 10.

The imager assembly 12 may further comprise a lens holder 44 configured to receive a mating portion 46 of the cylindrical profile 32. Also, similar to the front shield 38, the lens holder 44 may form a second exterior profile 48. In this configuration, the lens holder 44 may be configured to engage and be received by a second interior cavity 50 formed by the front shield 38. In an assembled configuration, the front shield 38 may be received by the first interior cavity 36 of the housing 14. Further, the lens 16 may engage the cylindrical opening 34, which may extend through the housing 14 and the front shield 38. The lens holder 44 may engage the mating portion 46 of the lens 16 and the second interior cavity 50 of the front shield 38 to retain the lens 16 in the housing 14.

The imager assembly 12 may further comprise at least one circuit 52, which may be in the form of one or more printed circuit boards (PCBs) 58. The one or more PCBs 58 of the circuit 52 may correspond to a plurality of PCBs comprising an imager 54 and one or more control circuits 56. The imager 54 may correspond to any form of light receiving circuitry, and in an exemplary embodiment, may correspond to a charged coupled device (CCD), a complimentary metal-oxide semiconductor (CMOS) image sensor, or other suitable imaging devices in accordance with the disclosure. In the various embodiments, the control circuit 56 and the imager 54 may be configured as a plurality of printed circuit boards, which may be arranged in a stacked parallel configuration, a perpendicular arrangement, or any combination thereof.

The lens holder 44 may be configured to receive the one or more PCBs 58 of the circuit 52. In an exemplary embodiment, the lens holder 44 may form a first mounting surface 60 and a second mounting surface 62. The first mounting surface 60 may extend parallel to a longitudinal axis 64 of the lens 16. The second mounting surface 62 may be oriented substantially perpendicular to the longitudinal axis 64 of the lens 16. In this configuration, a first PCB 58a a may be mounted to the lens holder 44 on the first mounting surface 60, and a second PCB 58b may be mounted to the lens holder 44 on the second mounting surface 62. In this arrangement, the first PCB 58a may be arranged substantially perpendicular to the second PCB 58b in an assembled configuration.

The circuit 52 may engage the lens holder 44 and be positioned with the lens 16 in a low profile configuration. The low profile configuration may be provided by the perpendicular configuration of the first PCB 58a and the second PCB 58b when mounted to the first mounting surface 60 and the second mounting surface 62. Though described as a perpendicular configuration, the PCBs 58a and 58b may be configured in various orientations, for example a stacked, parallel arrangement. In various embodiments, the one or more PCBs of the circuit 52 may be connected to the lens holder 44 via a plurality of fasteners 66.

As discussed herein, various components of the imager assembly 12 may be enclosed inside the first interior cavity 36 of the housing 14. For example the housing 14 may be configured to receive a secondary housing or an interior shielded housing 70. The interior shielded housing 70 may be formed by the front shield 38 and a rear shield 72. The interior shielded housing 70 may be configured to substantially enclose the lens 16, the lens holder 44, and the circuit 52. As discussed in reference to the front shield 38, the rear shield 72 may similarly be composed of a conductive material. In this way, the interior shielded housing 70 may form a barrier configured to block electromagnetic interference from entering the second interior cavity 50 of the front shield 38. In this configuration, the circuit 52 may be substantially protected from electromagnetic interference.

The rear shield 72 may form a third exterior profile 74 configured to substantially align with the first exterior profile 40 to form a complementary mating assembly of the shielded housing 70. In this configuration, the first cavity 36 of the housing 14 may be configured to receive the shielded assembly. The lid 18 of the imager assembly 12 may be configured to enclose an assembly opening 80 of the housing 14 and seal the imager module 10. In this configuration, the lid 18 may be attached, fused, and/or welded to the housing 14 to provide for the sealed enclosure. The lid 18 may further be configured to retain the interior shielded housing 70 within the housing 14.

As discussed herein, the imager connector 26 may pass through a first aperture 86 in the lid 18. Additionally, the imager connector 26 may pass through a second aperture 88 in the rear shield 72. In this configuration, a conductive connector 90 of the imager connector 26 may be communicatively coupled to the circuit 52 such that the imager connector 26 may extend outside the imager assembly 12. A wire seal 92 may be disposed between the imager connector 26 and the first aperture 86 to prevent the intrusion of water and/or dust from entering the interior cavity 36 of the housing 14.

Referring now to FIGS. 6 and 7, a side partial assembly view of the imager assembly 12 is shown. As demonstrated in FIGS. 6 and 7, the lens holder 44 is shown in connection with the lens 14, the first PCB 58a, and the second PCB 58b. The first PCB 58a is in connection with the first mounting surface 60, and the second PCB 58b is in connection with the second mounting surface 62. The first mounting surface 60 may extend perpendicular to the longitudinal axis 64 of the lens 16. The second mounting surface 62 may be oriented substantially parallel to the longitudinal axis 64 of the lens 16. In this configuration, a first PCB 58a may be mounted to the lens holder 44 on the first mounting surface 60, and the second PCB 58b may be mounted to the lens holder 44 on the second mounting surface 62.

The first mounting surface 60 may be formed by a plurality of posts 102 forming a first mounting plane 104, which may correspond to mating surfaces for the fasteners 66. The first PCB 58a may be connected to the posts 102 via the fasteners 66 to secure the first PCB 58a to the lens holder 44. The second mounting surface 62 may form a receiving feature 106 configured to receive and retain the second PCB 58b. The receiving feature 106 may correspond to one or more guides and/or receiving grooves 108 configured to form a second mounting plane 110. The receiving feature 106 may be configured to retain the second PCB 58b in an assembled configuration parallel to the second mounting plane 110 and the longitudinal axis 64. In this configuration, the lens holder 44 may form the posts 102 and/or the receiving grooves 106 to secure the first PCB 58a and the second PCB 58b. In some embodiments, the second PCB 58b may additionally or alternatively be secured to the lens holder 44 by one or more fasteners.

The conductive connector 90 may be configured to connect parallel to the second PCB 58b. For example, the conductive connector 90 may be configured to direct the imager connector 26 parallel to the second mounting plane 110 and the longitudinal axis 64. In this way, the arrangement of the first PCB 58a, the second PCB 58b, and the conductive connector 90 may provide for the image connector to be connected to the second PCB forward of a proximal end portion 112 of the lens 16. Additionally, the second PCB 58b may extend forward of the proximal end portion 112 toward the front surface 20 of the housing 14. In some embodiments, the conductive connector 90 may be configured to provide a connection from the imager 54 to the imager connector 26 via the second PCB 58b at a position between a distal end portion 114 and a proximal end portion 112 of the lens 16 along the longitudinal axis 64.

In some embodiments, the cylindrical profile 32 of the lens 16 may further comprise an annular groove 113. The annular groove 113 may be configured to receive an O-ring or seal, which may be configured to create a fluid barrier between the housing 14 and the lens 16. In this configuration, the sealed assembly of the imager module 10 may be resilient to various operating environments of a vehicle. In addition to the seal, the O-ring, and the wire seal 92, the imager assembly 12 may further comprise one or more additional seals and/or gaskets configured to further prevent the intrusion of fluids and/or dust from entering the first interior cavity 36 of the housing 14.

Figure 9:
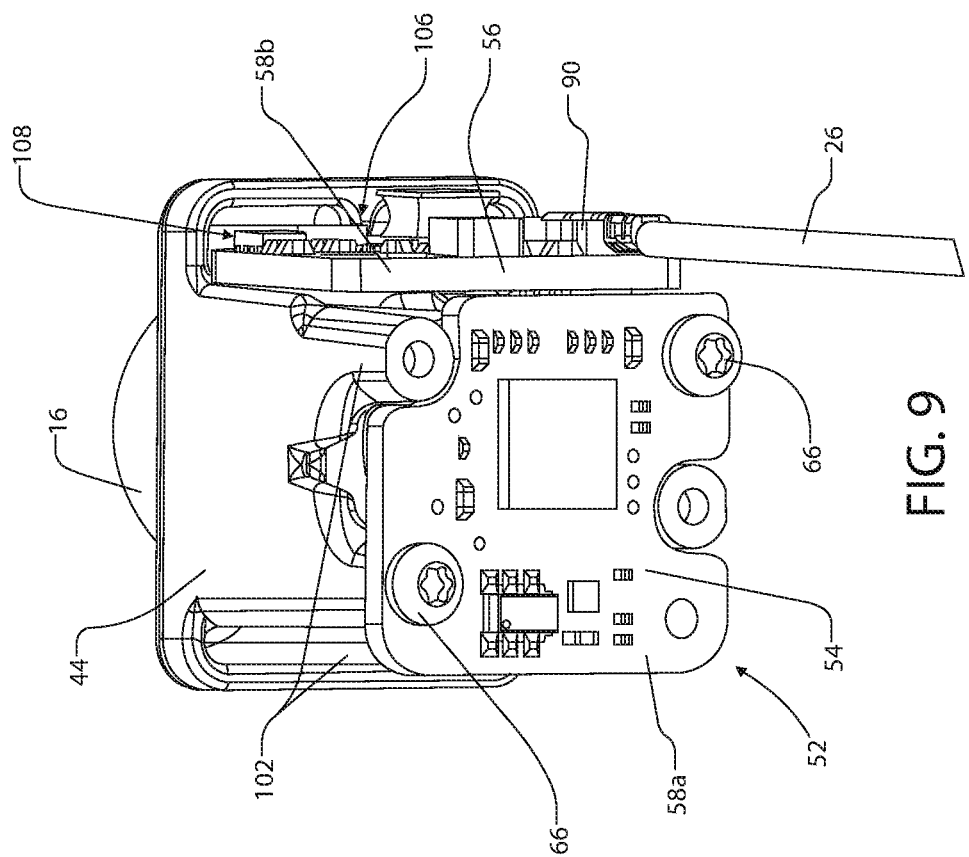
FIG. 9 is an expanded view demonstrating Detail B as introduced in reference to FIG. 8 of the present disclosure.
Figure 8:
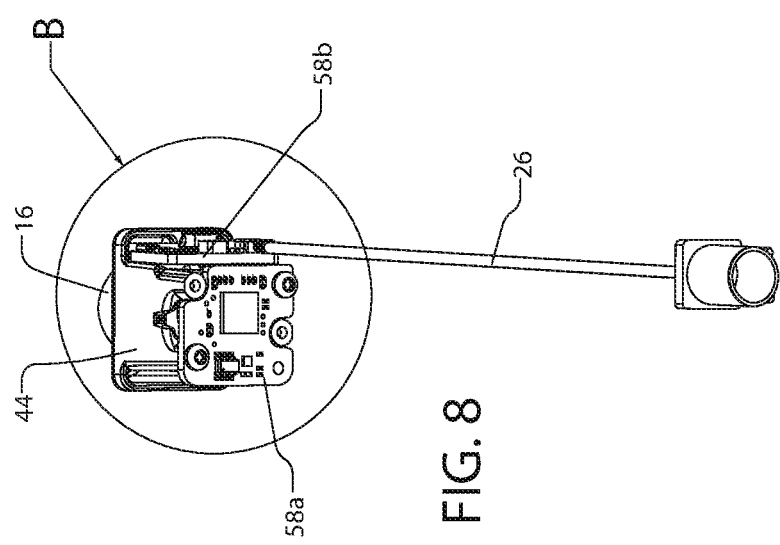
FIG. 8 is a perspective partial assembly view of an imager module demonstrating Detail B of the present disclosure.

Referring now to FIGS. 8 and 9, a perspective partial assembly view of the imager assembly 12 is shown. FIGS. 8 and 9 may demonstrate further details of the lens holder 44, the first PCB 58a, and the second 58b. As discussed previously, the first PCB 58a may comprise the imager 54. Accordingly, the lens holder 44 may provide for connection of the first PCB 58a and may further align the first PCB 58a with lens 16. The second PCB 58a may correspond to a control circuit 56. In this arrangement, the second PCB 58a may extend perpendicular to the first PCB 58a in a space-saving configuration.

FIGS. 8 and 9 may further demonstrate a connection of the conductive connector 90 perpendicular to the second PCB 58b. As shown, the perpendicular arrangement of the first PCB 58a, the second PCB 58b, and the conductive connector 90 may provide for the imager connector 26 to be connected to the second PCB 58b forward of a proximal end portion 112 of the lens 16. The conductive connector 90 may communicatively connect the imager 54 to the imager connector 26 via the second PCB 58b at a position between a distal end portion 114 and a proximal end portion 112 of the lens 16 along the longitudinal axis 64. In this arrangement, the first PCB 58a may be arranged substantially perpendicular to the second PCB 58b in an assembled configuration.

For purposes of disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An imager assembly for a vehicle comprising:
   an optic lens forming a longitudinal axis extending between a proximal end portion and a distal end portion;
   an imager circuit comprising a first circuit portion, a second circuit portion, and an imager connector, wherein the imager connector is configured to communicatively connect the imager circuit to the vehicle; and
   a lens holder configured to receive the proximal end portion of the optic lens, wherein the lens holder is in connection with the first circuit portion aligning the first circuit portion with the longitudinal axis of the optic lens, and wherein the lens holder is configured to retain the second circuit portion arranged substantially perpendicular to the first circuit portion and substantially parallel to the longitudinal axis.

2. The imager assembly according to claim 1, wherein the first circuit portion comprises a first printed circuit board (PCB) and the second circuit comprises a second PCB.

3. The imager assembly according to claim 2, wherein the lens holder comprises a receiving feature configured to receive the second PCB.

4. The imager assembly according to claim 3, wherein the receiving feature comprises at least one groove configured to retain to the second PCB extending parallel to the longitudinal axis.

5. The imager assembly according to claim 2, wherein the lens holder is configured to position the second PCB such that a portion of the second PCB is positioned between the proximal end portion and a distal end portion of the optic lens.

6. The imager assembly according to claim 2, wherein the conductive connection of the imager connector to the imager circuit is positioned between the proximal end portion and the distal end portion parallel to the longitudinal axis.

7. The imager assembly according to claim 1, wherein the first circuit portion comprises an imager configured to capture image data.

8. The imager assembly according to claim 7, wherein the lens holder is configured to align the imager with the longitudinal axis of the optic lens.

9. The imager assembly according to claim 7, wherein the lens holder comprises a plurality of posts extending substantially parallel to the longitudinal axis and configured to connect the first circuit portion to the lens holder via a plurality of fasteners.

10. An imager assembly for a vehicle comprising:
    an optic lens forming a longitudinal axis extending between a proximal end portion and a distal end portion;
    an imager circuit comprising a first circuit portion and a second circuit portion, the imager circuit in conductive connection with an imager connector, wherein the imager connector is configured to communicatively connect the imager circuit to the vehicle, wherein the second circuit portion extends at least partially between the proximal end portion and the distal end portion of the optic lens; and
    a lens holder configured to receive the proximal end portion of the optic lens and align the imager circuit with the optic lens, wherein the conductive connection of the imager connector to the imager circuit is located between the proximal end portion and the distal end portion.

11. The imager assembly according to claim 10, wherein the first circuit portion comprises a first PCB and the second circuit portion comprises a second PCB.

12. The imager assembly according to claim 11, wherein the first PCB is arranged substantially perpendicular to the longitudinal axis of the optic lens.

13. The imager assembly according to claim 12, wherein the second PCB is arranged parallel to the longitudinal axis of the optic lens.

14. The imager assembly according to claim 11, wherein the conductive connection of the imager connector is located on the second PCB between the proximal end portion and the distal end portion of the optic lens.

15. The imager assembly according to claim 10, wherein the first circuit portion comprises an imager configured to capture image data.

16. The imager assembly according to claim 15, wherein the second circuit portion comprises a control circuit configured to control the capture of the image data.

17. An imager assembly for a vehicle comprising:
    an optic lens forming a longitudinal axis extending between a proximal end portion and a distal end portion;
    an imager circuit comprising:
       a first circuit portion comprising an imager configured to capture image data;
       a second circuit portion comprising a control circuit configured to control the capture of the image data; and
       an imager connector, wherein the imager connector is configured to communicatively connect the imager circuit to the vehicle; and
    a lens holder configured to receive the proximal end portion of the optic lens, wherein the lens holder is in connection with the first circuit portion aligning the imager with the longitudinal axis of the optic lens, and wherein the lens holder is configured to retain the second circuit portion arranged substantially perpendicular to the first circuit portion and substantially parallel to the longitudinal axis.

18. The imager assembly according to claim 17, further comprising:
    a front shield formed of a conductive material, wherein the front shield forms a cylindrical opening configured to accommodate the distal end portion of the optic lens; and
    a rear shield forming a complementary mating assembly with the front shield forming a shielded housing, wherein the shielded housing is configured to enclose the imager circuit thereby shielding the imager circuit from electromagnetic interference.

* * * * *